UNITED STATES PATENT OFFICE.

JAMES B. PIERCE, JR., OF CHARLESTON, WEST VIRGINIA.

PROCESS FOR MANUFACTURE OF STRONTIUM PEROXID.

1,325,043.      Specification of Letters Patent.      Patented Dec. 16, 1919.

No Drawing.      Application filed June 3, 1918. Serial No. 237,936.

*To all whom it may concern:*

Be it known that I, JAMES B. PIERCE, Jr., a citizen of the United States, and resident of Charleston, in the county of Kanawha and State of West Virginia, have invented new and useful Improvements in Processes for Manufacture of Strontium Peroxid, of which the following is a description.

The invention relates to a process for manufacturing strontium peroxid.

Strontium peroxid has in the past always been prepared in a wet way from some compound of strontium soluble in water, more especially the hydrate of strontium and hydrogen peroxid. The strontium peroxid resulting from this method of preparation possesses many undesirable properties which have practically rendered it unfit for many uses to which it otherwise might be adapted. One of the particular characteristics of strontium peroxid as prepared in the above manner which is especially objectionable, is its light, fluffy, physical character.

Attempts have been made to synthesize strontium peroxid similarly to barium peroxid, by passing air over strontium oxid at various temperatures and pressures but without success.

My process for the manufacture of strontium peroxid consists in bringing strontium oxid into direct combination with oxygen and I have discovered that this union may be brought about by bringing oxygen under pressure into the direct union with strontium peroxid. The chemical reaction may be represented thus:—

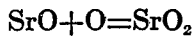

$$SrO + O = SrO_2$$

By using oxygen I have succeeeded in preparing a high test strontium peroxid, viz: over 85.0% $SrO_2$.

In bringing the oxygen into direct combination with the strontium oxid the strontium oxid is placed in a closed steel vessel and the oxygen then introduced under pressure and I have found that oxygen under a pressure of about 1500 to 1800 lbs. per square inch is suitable. The elements thus brought into combination are heated together in the vessel to about 400° to 500° centigrade.

The physical properties of the strontium peroxid synthesized by my process are very similar to barium peroxid as regards density, etc., which makes the use of the strontium peroxid possible wherever barium peroxid is used, with the added advantage of its higher content of available oxygen.

What I claim as my invention is:

1. The process of manufacturing strontium peroxid which consists in bringing strontium oxid into direct union with oxygen under pressure in the presence of heat.

2. The process of manufacturing strontium peroxid which consists in bringing oxygen into direct combination with strontium oxid in a closed vessel, the oxygen being introduced into the vessel at a pressure from 1500 to 1800 pounds per square inch, and heating the elements thus brought together to about 400° to 500° centigrade.

In testimony whereof, I affix my signature.

JAMES B. PIERCE, JR.

Witnesses:
HUGH G. NICHOLSON,
HENRY WALKER.